March 10, 1964 L. C. TIDBALL 3,124,260

DATA STORAGE

Original Filed March 9, 1959 2 Sheets-Sheet 1

INVENTOR.
LLOYD C. TIDBALL

BY
Edward A. Robinson
ATTORNEY

March 10, 1964 L. C. TIDBALL 3,124,260

DATA STORAGE

Original Filed March 9, 1959

2 Sheets-Sheet 2

United States Patent Office 3,124,260

Patented Mar. 10, 1964

3,124,260

DATA STORAGE

Lloyd C. Tidball, Saratoga, Calif., assignor to International Business Machines Corporation, New York, N.Y., a corporation of New York Continuation of application Ser. No. 798,069, Mar. 9, 1959. This application May 11, 1961, Ser. No. 112,155

11 Claims. (Cl. 214—95)

This invention relates to data storage devices and more particularly to such devices wherein the data is recorded upon record sheets such as film strips and wherein the record sheets may be selected from a bin or file and mechanically moved into alignment with a processing station for recording and/or reproducing data therefrom.

This application is a continuation of application Serial No. 798,069 filed March 9, 1959, now abandoned.

It is an object of this invention to provide an improved arrangement for storing data which may be recorded on record sheets or photographic film strips stored side by side in bins, a selected one of the record sheets being moved by a pickup device from the bin along a flexible guideway to a processing station.

A further object of this invention is to provide an improved means for selection and pickup of a record sheet from the bin such that a selected one of the record sheets or film strips is removed while unwanted adjacent film strips are retained in the bin by a resilient abutting member.

Another object of this invention is to provide an improved arrangement for storing film strips or record sheets and for selective removal of a desired film strip while the remaining film strips are retained in the bin. The pickup arrangement may include a centrally disposed magnet with a pole piece movable downwardly into a slot or opening in an outer abutting bracket whereby the selected film strip may be magnetically engaged and drawn upwardly through the opening while the unwanted adjacent film strips are held by the abutting surface of the bracket.

Other objects of the invention will be pointed out in the following description and claims and illustrated in the accompanying drawings which disclose, by way of example, the principle of the invention and the best mode which has been contemplated of applying that principle.

Figures 1, 2:
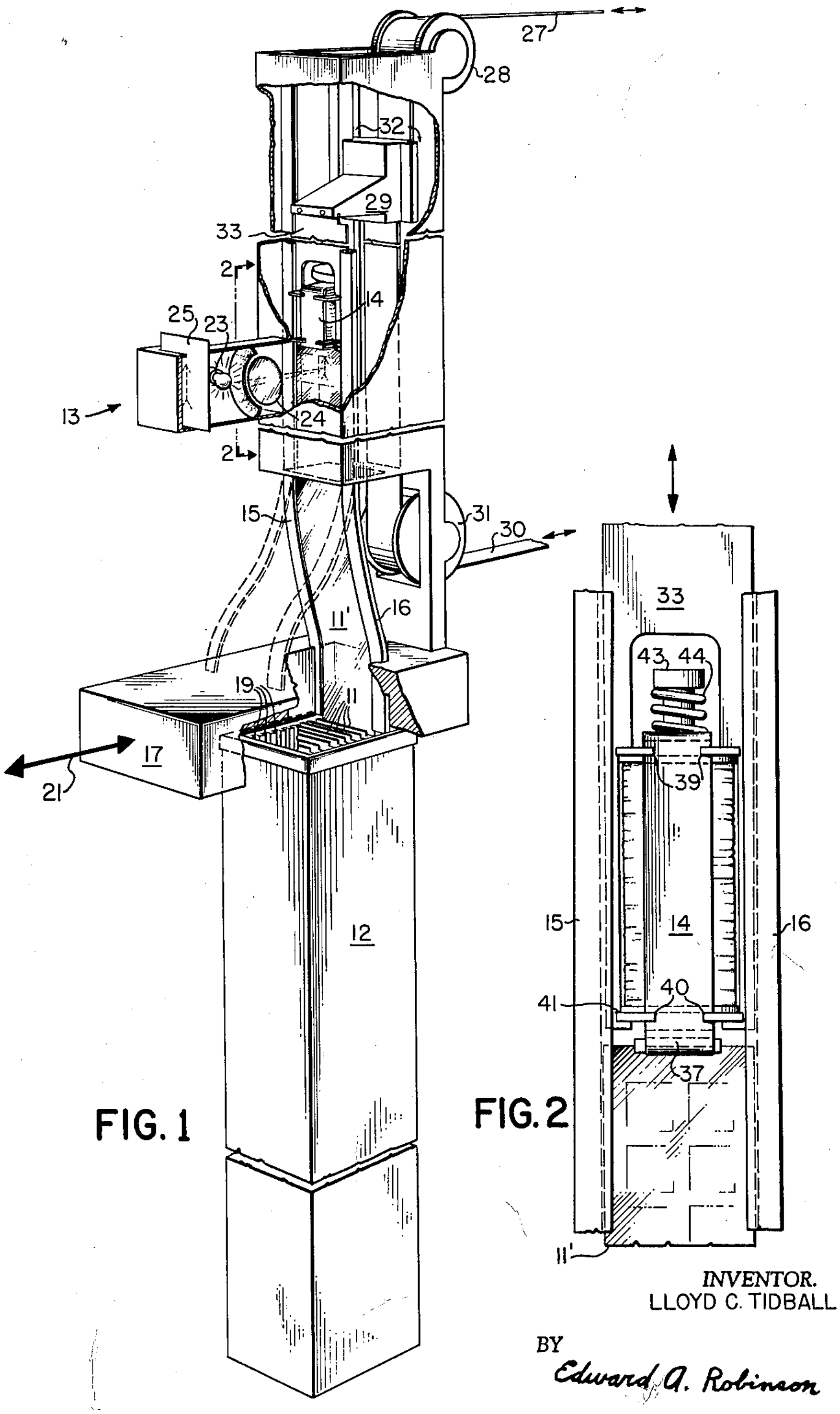
FIG. 1 is a perspective view of the storage device according to this invention showing a bin containing film strips and a pickup arrangement for moving a selected film strip through a flexible guideway to a processing station.
FIG. 2 is a vertical elevational view looking along the plane 2—2 of FIG. 1, but with the processing station removed.

Briefly stated, this invention provides a storage arrangement wherein various record sheets in the form of film strips 11 are stored vertically in a side by side arrangement in a cell or storage bin 12. As shown in FIG. 1 a processing station 13 is mounted above the bin 12 and a pickup device 14 is movable along spaced apart guideways 15 and 16 for selectively engaging and moving a desired one of the film strips 11' from the storage position in the cell 12 to a position in alignment with the processing station 13. The guide members 15 and 16 may be a flexible material which is rigidly supported at the station 13 and which is further rigidly supported in a movable carriage 17 but is free to flex permitting movement of the carriage 17 with respect to the station 13. Carriage 17 is supported above the storage bin in any suitable manner, e.g. by guides (not shown), for movement in a straight line across the open end of the bin. The pickup device 14 includes an inner magnet for engaging and lifting the selected one of the film strips by a magnetizable metal tab 20 and further includes an outer frame part for resiliently abutting against and retaining unwanted adjacent film strips.

As shown in FIG. 1, the film strips 11 are initially stored in a bin or cell 12 in longitudinally extending grooves or guideways 19 provided on opposite inner faces of the cell. The film strips 11 are dimensioned to slide into the guideways 19 and thus be supported along the opposite edges thereof and with no contact between adjacent film strips. Each of the film strips 11 is provided with a lightweight tab or cleat 20 of magnetic material such as soft iron attached along the upper edge thereof.

Selection of a desired film strip is accomplished by positioning the carriage 17 in a direction indicated by the arrows 21 such that the guideways 15 and 16 become aligned at their lower extremities with a selected pair of grooved guideways 19 of the cell 12. With the carriage 17 thus positioned, the pickup device 14 is moved downwardly through an opening in the carriage upon the film strips 11 and thence returned upwardly whereupon the desired film strip 11' is pulled by the pickup device 14 through the guides 15 and 16 to a position in alignment with the processing station 13. The station 13 may be of conventional design for recording information upon the film strip and/or for subsequently reproducing the previously recorded information upon an output means. FIG. 1 illustrates the processing station as having a source of illumination 23, a lens 24 and a further data sheet 25 which may be either input data to be upon the film strip 11', or a readout sheet which may optically receive previously recorded data from the film strip 11'.

A drive arrangement for moving the pickup device 14 includes a flexible belt or tape 27 trained about a pulley 28 and attached to a movable bracket 29 and further includes another flexible tape 30 trained about a lower pulley 31 extending upwardly and likewise attached to the bracket 29. The lower band 30 may be mechanically coupled to a resilient tensioning or take-up device (not shown) such that a downward force is continually urged against the bracket 29 which is mounted to slidably move in a vertical direction in ways 32. The bracket 29 may thus be moved upwardly or downwardly and positioned selectively by movement of the band 27.

A band 33 of a flexible material such as spring steel, phosphur-bronze or heat-treated beryllium copper is slidably mounted between the guideways 15 and 16 and is attached at one end to the bracket 29. As best shown in FIG. 2, the other end of the beryllium copper band 33 is bifurcated or forked, and the pickup device 14 is mounted therein. Thus, the pickup device 14 is moved along the guideways 15 and 16 in response to drive movement or positioning on the belt or tape 27, and the band 33.

The pickup device specifically illustrated in FIGS. 1 through 6 includes an electromagnet 35 having a pole piece with a probe tip 36 and an outer frame or bracket 37. The frame 37 contains a centrally disposed opening 38 dimensioned such that the pole tip 36 of the magnet may descend therein. The magnet 35 is mounted between top and bottom brackets 39 and 40 which are formed to receive the bifurcated end of the beryllium copper band 33 and may be attached thereto by means such as a weld 41. The outer frame 37 encompasses the magnet 35 and is slidably mounted in the brackets 39 and 40. The magnet 35 is further provided with an upwardly extending stud 42 having an enlarged end or cap 43 which secures or retains a compression spring 44. The compression spring 44 being positioned about the stud 42 and between the bracket 47 and the cap 43, will exert a force urging the outer frame 37 downwardly with respect to inner magnet 35.

Figures 3, 4, 5, 6:
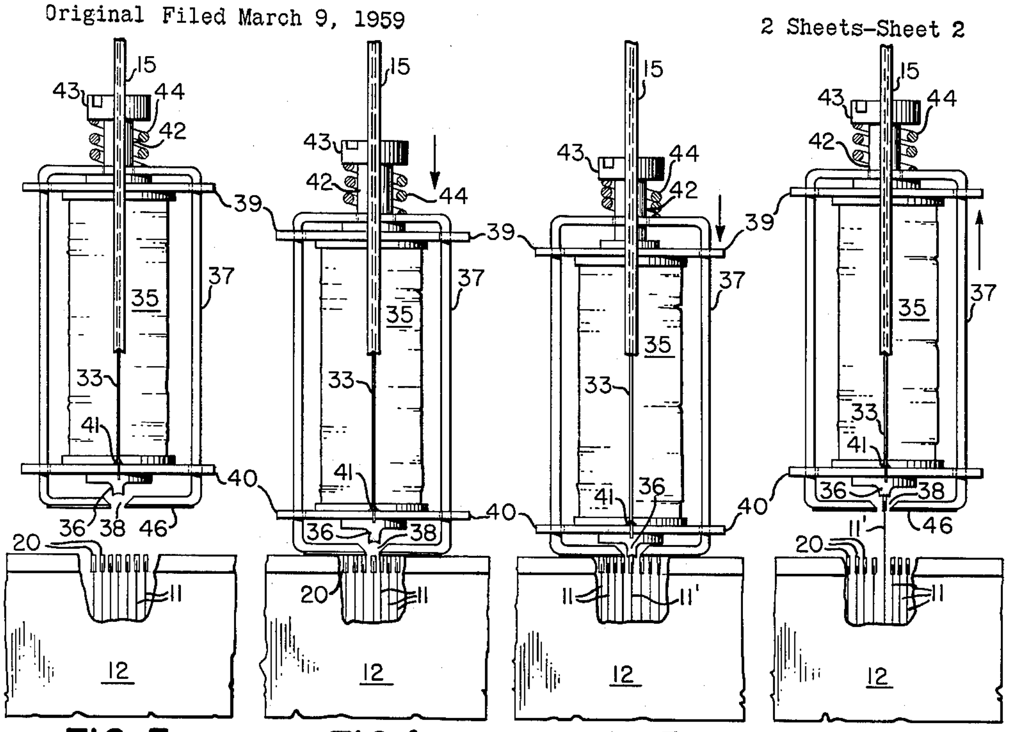
FIGS. 3, 4, 5 and 6 are all similar, enlarged elevational views of one embodiment of a pickup device used in this invention, but illustrating various positions in the cycle of operation.

FIG. 3 illustrates the pickup device as it may descend downwardly upon the film strips 11 positioned within a bin 12. It may be noted in FIG. 3 that the lower surface of the outer frame 37 extends downwardly or forwardly of the magnet pole tip 36, and as shown in FIG. 4 the outer frame is first to contact and abut against the unwanted film strips 11 on each side of the selected film strip 11'. As the beryllium copper drive member 33 continues to move the magnet 35 downwardly the outer frame 37 is held stationary in its abutting relationship with the film strips 11, the spring 44 is compressed and the pole piece 36 of the magnet 35 moves into the opening 38 and contacts the magnetic tab of the desired film strip 11', FIG. 5. The magnet 35 is energized and the beryllium copper drive member 33 moves upwardly pulling the desired film strip into the opening 38 while the compression spring 44 resiliently holds the outer frame 37 in an abutting relationship with the unwanted adjacent film strips 11 until the magnetic tab of the desired film strip has passed through the opening 38 and has therefore completely separated from the adjacent magnetic tabs.

The outer frame 37 may be of magnetic material and will therefore provide a return path for magnetic flux from the magnet pole 36 through the tab of the selected film strip 11' and thence around through the outer frame parts 37. All stray magnetic flux which may otherwise tend to attract the tabs of the unwanted film strips is thereby substantially eliminated. The lower abutting surface of the brackets 37 is coated with a thickness of non-magnetic material 46 to prevent the magnetic tabs of the unwanted film strips 11 from "sticking" to the lower surface of the frame 37. As the beryllium copper drive member 33 continues to move upwardly as shown in FIG. 6, the outer frame 37 becomes seated in its lowermost position with respect to the magnet 35 and the selected film strip 11' will continue to adhere to the magnet pole tip 36 and will move through the guideways 15 and 16 as shown in FIGS. 1 and 2.

Figures 7, 8, 9:
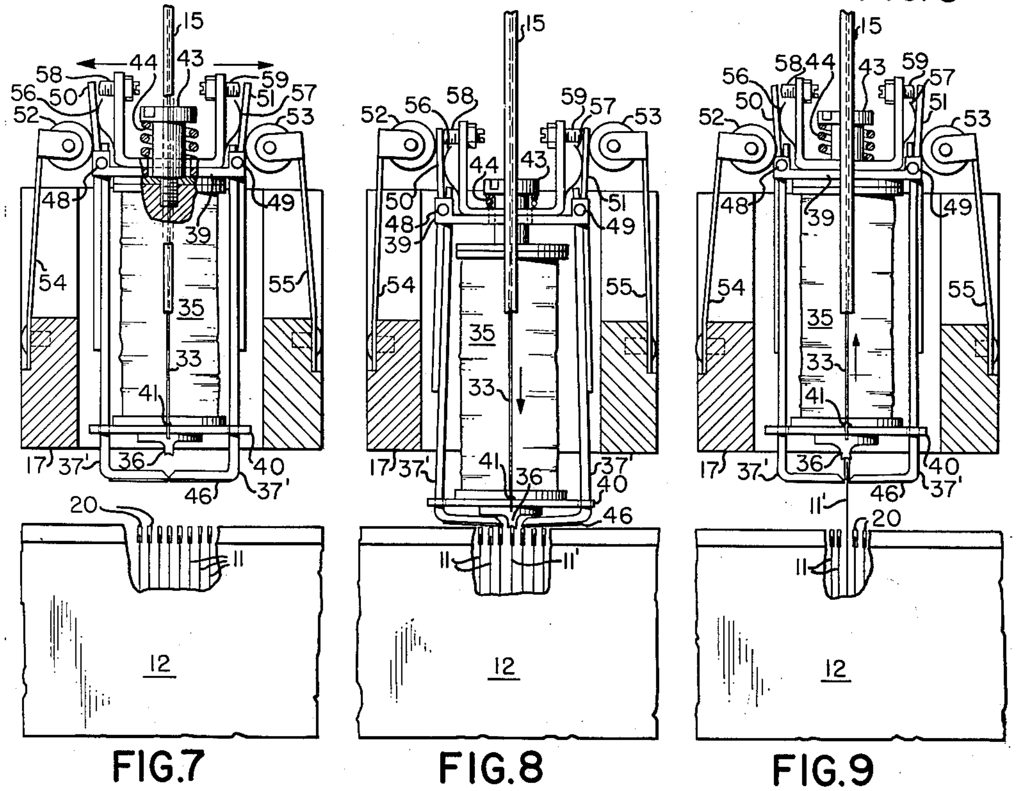
FIGS. 7, 8 and 9 are similar elevational views of another embodiment of the pickup device likewise illustrating several positions during a cycle of operation.

FIGS. 7, 8 and 9 show an alternative form of the film pickup device 14 wherein outer frame member 37' functions in a manner similar to the frame members 37 of FIGS. 3, 4, 5 and 6 in abutting against and retaining the unwanted film strips, but after the magnet has drawn the desired film strip upwardly the frame members 37' mechanically close upon and hold the desired film strip 11' as a pair of jaws. As in the previous embodiment the inner magnet is supported by the beryllium copper drive strip 33 and the outer frame members 37' are urged downwardly with respect to the inner magnet by a compression spring 44. In this embodiment, however, the outer frame members 37' are mounted on the upper bracket 39 by pivots 48 and 49. A pair of upwardly extending members 50 and 51 are attached to the outer frame or jaw members 37' by means such as welding and diverge outwardly from the pivot points 48 and 49.

A pair of rollers 52 and 53 are mounted on resilient supports 54 and 55 which are attached to and supported by the carriage 17.

The jaw or outer frame members 37' are normally held together as shown in FIG. 7 by a pair of springs 56 and 57 which bear against the upper horn-like members 50 and 51. When the pickup device is moved downwardly the outer frame 37' first passes between the rollers 52 and 53 and the jaws remain closed until the pivot points 48 and 49 have likewise passed between the rollers 52 and 53. However, as the device continues to move downwardly as shown in FIG. 8, the rollers 52 and 53 will exert pressure against the divergent upwardly extending members 50 and 51 causing these members to close inwardly against adjustable limit stops 58 and 59 causing pivotal movement about the points 48 and 49 to effect an opening of the jaws 37'. As the beryllium copper drive member 33 forces the inner magnet 35 downwardly, the pole tip 36 thereof will descend through the opened jaws 37' to contact the magnetic tab of the selected film strip 11'.

FIG. 9 illustrates the pickup device moving upwardly whereupon the inner magnet 35 carries the selected film strip 11' upwardly between the jaws 37. As the upward movement continues the jaw members 37' will likewise move upwardly while the rollers 52 and 53 retain their normal position and the pressure against the upward divergent members 50 and 51 is relieved whereupon the jaws 37 will close upon the film strip. The film strip will then be mechanically held in the jaws 37' and the magnet 35 may be deenergized as the upward travel continues.

As shown in FIG. 1, the flexible guideways 15 and 16 are rigidly held within the processing station 13 and are rigidly held within the carriage 17, but are permitted to span freely the space between the station and the carriage 17. Since there is no rigid connection between the station 13 and the carriage 17, the carriage is free to move across the top of the bin 12 and the lower extremities of the guideways 15 and 16 are thus positionable in close spaced relation with the grooves 19 for selection of a film strip 11.

With the guideways 15 and 16 so positioned, the selected film strip 11' may be pulled from the bin and will follow the pickup device 14 directly behind the beryllium copper drive means 33. Thus, in one sense the pickup device 14 merely provides a mechanical coupling to permit the film strip to follow the same track or guideway as the beryllium copper band 33.

Data may be stored at various locations upon the film strip 11 by selectively positioning the film strip in alignment with the station 13. Thus, in the embodiment illustrated, it is contemplated that a plurality of reduced images may be imprinted upon the film strip along its length; and that in reproducing particular stored information, a particular portion of the film strip shall be positioned in alignment with the processing station. However, upon completion of a data recording or reproduction operation, the film strip must be returned to the same pair of slotted guides 19 from whence it came in the bin 12. To facilitate a quick return of the film strip into the bin, the lower portion thereof (about 4 inches) will remain unused for storage purposes and, therefore, the film strip 11 will never be completely removed from the bin 12. During recording or reproducing operations, the lower extremity of the film strip will always remain in the bin, and upon completion of the operations the drive means 27, 29, 33 will quickly lower the film strip back into the slots 19 from which it was never completely removed.

Obviously, the operation of the pickup devices 14 in returning a film strip to the bin is the reverse of the initial selection thereof. The beryllium copper drive band lowers the pickup device until a position is reached corresponding to FIG. 5 or FIG. 8 depending upon which type of pickup device is being used. With the magnet 35 de-energized, the pickup device is raised to the position shown in FIG. 3 or FIG. 7. It will be unnecessary to raise the pickup device further since the next cycle of operation may be commenced immediately by movement of the carriage 17 for selection of the next desired film strip.

While the present invention has been illustrated in connection with an optical processing station for photographically recording data upon the film strips, it is not limited to such use.

The present invention may be employed with any desired means of recording data on film strips, e.g., a magnetic system. In such case, the lens, bulb, etc. may be replaced with a magnetic read/write head and the film strips coated with a magnetizable medium rather than a photographic layer.

To increase the storage capacity of an accounting machine utilizing this invention, a plurality of cells or bins 12 may be used. Further positioning and drive means (not shown) may move a selected one of the bins 12 into an operative relationship with the carriage 17. However, for purposes set forth herein, it may be assumed that the bin selection has been made by other means and that this invention deals principally with the selection of a film strip within the single selected bin 12 shown in FIG. 1.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. Apparatus for withdrawing from a bin a selected one of a plurality of record sheets having a magnetic tab, said apparatus comprising: a magnet movable into spaced relation with the bin for engaging and magnetically holding the tab of the selected record sheet; an outer frame slidably mounted on the magnet, said outer frame abutting against and retaining unwanted ones of the record sheets within the bin; resilient means coupled between the magnet and the outer frame for urging the frame forwardly of the magnet; and means drivingly coupled to the magnet for moving the magnet into engagement with the selected record sheet and then withdrawing the magnet together with the selected record sheet while the outer frame is resiliently held abutting against the unwanted record sheets.

2. Apparatus according to claim 1 wherein the abutting surface is coated with a non-magnetic material and is provided with a central opening and wherein the magnet includes a pole tip which engages and pulls the tab of the selected record sheet through the opening whereby stray magnetic flux is minimized and the tabs of the unwanted record sheets are not magnetically attracted.

3. Apparatus according to claim 1 wherein the outer frame comprises a pair of jaws and wherein the magnet includes a pole tip which engages and pulls the tab of the selected record sheet between the jaws, said jaws being operable to mechanically clamp the selected record sheet to facilitate the withdrawal thereof from the bin.

4. Recording apparatus comprising: a bin for storing a plurality of film strips having magnetic tabs attached thereto; a processing station; and transport means for moving a selected one of the film strips from the bin to the station, said transport means including a magnet movable between the station and a position spaced from the bin for engagement with the tab of the selected film strip and an outer frame mounted on and movable with respect to the magnet, said outer frame being operable to engage and resiliently hold unwanted film strips which are adjacent to the selected film strips while the magnet engages the magnetic tab of the selected film strip and moves the film strip from the bin.

5. Recording apparatus comprising: a bin of flexible film strips; a processing station spaced from the bin; and a transport means for moving a selected one of the film strips from the bin to the processing station, said transport means including a carriage positioned between the bin and the processing station, flexible guide means extending between the carriage and the processing station, the carriage being movable to align the flexible guide means with a selected film strip, and a strip holding means movable along the flexible guide means and operable to engage and move the selected film strip from the bin to the processing station.

6. Recording apparatus according to claim 5 wherein the flexible guide means comprises a pair of elongated members which are spaced apart from each other and which have oppoesd spaced grooved slideways for guiding the strip holding means and the selected film strip between the bin and the processing station.

7. Recording apparatus comprising: a storage bin having a plurality of grooved film slots on opposite inner surfaces thereof; a plurality of flexible film strips each positioned in an opposing pair of the slots; a processing station spaced from the bin; a carriage positioned between the station and the bin, the carriage being mounted to move across an open end of the bin; a pair of flexible spaced apart guideways extending from the carriage to the processing station, the carriage being positionable to align the guideways with a selected pair of slots for selection of a desired film strip; and a film pickup device mounted to move along the flexible guideways; said pickup device being operable to transport the selected strip along the flexible guideway to the processing station.

8. Recording apparatus comprising: a storage bin having a plurality of opposed spaced grooves on opposite inner surfaces thereof; a plurality of flexible film strips each positioned in an opposing pair of the grooves; a processing station spaced from the bin; a carriage positioned between the bin and the station and mounted to move across an open end of the bin, said carriage being positionable in spaced relation with the grooves for selection of a film strip; a pair of spaced apart guideways extending from the carriage to the processing station, said guideways having a flexible portion to permit movement of the carriage relative to the station; a film pickup device mounted to move along the guideways; drive means attached to the film pickup device and mounted to move within the guideways, said pickup device being operable to engage and pull the selected film strip from the bin to the processing station, said guideways being operable to slidably support the pickup device, the drive means, and the selected film strip.

9. Recording apparatus comprising: a storage bin containing a plurality of film strips; a fixed processing station spaced apart from the storage bin; and a means for selecting and moving a flexible film strip from the bin to the processing station, said means including a carriage positioned between the station and the bin, the carriage being movable across the storage bin for selection of a film strip, a pair of guideways which are spaced apart to slidably support the selected film strip therebetween, said guideways being fixed in the carriage and in the station and having a flexible portion spanning the space therebetween, a flexible band slidably mounted between the guideways for moving and positioning the selected film strip with respect to the bin and the station, and a film pickup device mounted at the end of the band and operable to engage and hold the selected film strip for movement with the band.

10. Recording apparatus comprising: a storage bin containing a plurality of film strips each having a magnetic tab attached to one end thereof; a carriage movable across the bin for selection of a film strip; and a film pickup device movable relative to the carriage for engaging and withdrawing the selected film strip, said film pickup device including an inner magnet with a pole face for engaging and magnetically holding the magnetic tab of the selected film strip, and an outer frame including a pair of jaws normally closed over the magnetic pole face, cooperating means mounted on the carriage and on the jaws for causing the jaws to open when the pickup device moves to the carriage and into spaced relation with the selected film strip.

11. Recording apparatus according to claim 10 wherein the cooperating means for opening the jaws of the pickup device comprises a pair of spaced apart rollers resiliently attached to the carriage and wherein the jaws are pivotally mounted about the magnet and are provided with divergent arm members for engaging the rollers and causing the jaws to pivot and open.

References Cited in the file of this patent

UNITED STATES PATENTS 544,493 Wigle ---------------- Aug. 13, 1895
938,625 Anderson -------------- Nov. 2, 1909

2,643,005 De Jarnett -------------- June 23, 1953
2,854,888 Kaye -------------------- Oct. 7, 1958
2,865,249 Zweidinger ------------ Dec. 23, 1958
2,885,096 De Jarnett --------------- May 5, 1959
2,874,855 Rees -------------------- Feb. 24, 1959
2,936,672 May --------------------- May 17, 1960

FOREIGN PATENTS 843,954 France ------------------ Apr. 11, 1939
1,041,274 Germany --------------- Oct. 16, 1958